United States Patent
Brand et al.

(10) Patent No.: US 12,331,672 B2
(45) Date of Patent: Jun. 17, 2025

(54) DUAL-ACTING VALVE ENABLED CATALYST BYPASS

(71) Applicant: FCA US LLC, Auburn Hills, MI (US)

(72) Inventors: Jeff Brand, Highland, MI (US); Michael P Schmidt, Highland, MI (US); David A Scott, Holly, MI (US); Philip J Insalaco, Fenton, MI (US)

(73) Assignee: FCA US LLC, Auburn Hills, MI (US)

( * ) Notice: Subject to any disclaimer, the term of this patent is extended or adjusted under 35 U.S.C. 154(b) by 3 days.

(21) Appl. No.: 18/309,382

(22) Filed: Apr. 28, 2023

(65) Prior Publication Data

US 2023/0374926 A1    Nov. 23, 2023

Related U.S. Application Data

(60) Provisional application No. 63/343,839, filed on May 19, 2022.

(51) Int. Cl.
*F01N 3/20* (2006.01)
*F16K 1/20* (2006.01)

(52) U.S. Cl.
CPC .......... *F01N 3/2053* (2013.01); *F16K 1/2007* (2013.01); *F01N 2410/06* (2013.01)

(58) Field of Classification Search
CPC ............... F01N 3/2053; F01N 2240/36; F01N 2340/06; F01N 2410/03; F01N 2410/06; F01N 3/101; F01N 3/2006; F01N 9/00; F16K 1/2007; Y02T 10/12
See application file for complete search history.

(56) References Cited

U.S. PATENT DOCUMENTS

| | | |
|---|---|---|
| 8,528,327 B2 | 9/2013 | Bucknell et al. |
| 9,644,514 B1 * | 5/2017 | Langenfeld ........... F01N 13/102 |
| 2007/0089413 A1 | 4/2007 | Green et al. |

(Continued)

FOREIGN PATENT DOCUMENTS

| | | | |
|---|---|---|---|
| CN | 101251037 A | | 8/2008 |
| DE | 102010015605 | * | 8/2011 |

(Continued)

OTHER PUBLICATIONS

International Search Report and Written Opinion dated Aug. 31, 2023 for International Application No. PCT/US2023/067106, International Filing Date May 17, 2023.

*Primary Examiner* — Phutthiwat Wongwian
*Assistant Examiner* — Diem T Tran
(74) *Attorney, Agent, or Firm* — Jeremy J. Klobucar

(57) ABSTRACT

An internal combustion engine includes a cylinder head with an exhaust manifold configured to supply exhaust gas through a main exhaust outlet to a main exhaust aftertreatment system having a main catalytic converter, a bypass passage in fluid communication with the exhaust manifold via a bypass port, a bypass catalytic converter disposed within the bypass passage, and a dual-acting valve assembly configured to move between a first position that seals the bypass port, and a second position that seals the main exhaust outlet. During cold start, long idle, and/or low main catalytic converter temperature conditions, the dual-active valve assembly is moved to the second position to direct exhaust flow through the bypass passage and the bypass catalytic converter to reduce emissions.

11 Claims, 7 Drawing Sheets

(56) References Cited

U.S. PATENT DOCUMENTS

| | | | |
|---|---|---|---|
| 2010/0257846 A1* | 10/2010 | Weber | F01N 3/225 |
| | | | 60/287 |
| 2011/0271673 A1 | 11/2011 | Koenigsegg | |
| 2012/0017587 A1 | 1/2012 | Yoshida et al. | |
| 2019/0242296 A1 | 8/2019 | Zhang et al. | |
| 2022/0235725 A1* | 7/2022 | Brand | F01N 3/2882 |

FOREIGN PATENT DOCUMENTS

| | | | |
|---|---|---|---|
| DE | 102019125239 A1 | | 3/2020 |
| ES | 2265372 | * | 2/2007 |
| ES | 2265372 T3 | | 2/2007 |
| JP | 2007-032414 | * | 2/2007 |
| JP | 2008-106714 | * | 5/2008 |

* cited by examiner

DUAL-ACTING VALVE ENABLED CATALYST BYPASS

CROSS-REFERENCE TO RELATED APPLICATION

This application claims the benefit of U.S. Provisional Pat. App. No. 63/343,839 filed May 19, 2022, the contents of which are incorporated herein by reference thereto.

FIELD

The present application relates generally to internal combustion engine exhaust treatment systems and, more particularly, to an internal combustion engine having a light-off catalyst bypass system.

BACKGROUND

In conventional internal combustion aftertreatment systems it is difficult to achieve low tailpipe emissions in the time immediately following a cold engine start due to low catalyst conversion efficiency of cold catalysts. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work for their intended purpose, it is desirable to provide continuous improvement in the relevant art.

SUMMARY

In accordance with one example aspect of the invention, an internal combustion engine is provided. In one example implementation, the engine includes a cylinder head with an exhaust manifold configured to supply exhaust gas through a main exhaust outlet to a main exhaust aftertreatment system having a main catalytic converter, a bypass passage in fluid communication with the exhaust manifold via a bypass port, a bypass catalytic converter disposed within the bypass passage, and a dual-acting valve assembly configured to move between a first position that seals the bypass port, and a second position that seals the main exhaust outlet. During cold start, long idle, and/or low main catalytic converter temperature conditions, the dual-active valve assembly is moved to the second position to direct exhaust flow through the bypass passage and the bypass catalytic converter to reduce emissions.

In addition to the foregoing, the described engine may include one or more of the following features: a main outlet duct configured to receive exhaust gas flow from the exhaust manifold and define the main exhaust outlet; wherein the bypass port is formed in the main outlet duct; wherein the main outlet duct is a separate and distinct component configured to couple to the cylinder head; wherein the main outlet duct is a turbine inlet; and wherein the main outlet duct includes a recessed first valve seat formed about the bypass port, and wherein in the first position, the dual-acting valve assembly is configured to seat flush within the recessed first valve seat to facilitate preventing obstruction of exhaust gas flow within the main outlet duct.

In addition to the foregoing, the described engine may include one or more of the following features: wherein the main outlet duct further includes a recessed second valve seat formed about the main exhaust outlet, and wherein in the second position, the dual-acting valve assembly is configured to seat flush within the recessed second valve seat to facilitate preventing obstruction of exhaust gas flow within the main outlet duct; wherein the dual-acting valve assembly includes a valve door coupled to a valve shaft; wherein the valve shaft is rotatably seated within a bore formed in the main outlet duct, the valve shaft rotatable to move the valve door to the first position to seal the bypass port, and the second position to seal the main exhaust outlet; an actuator assembly operably coupled to the valve shaft to rotate the valve shaft within the bore; and a turbocharger, wherein the actuator assembly is coupled to the turbocharger, and wherein an actuator link is operably coupled between the actuator assembly and the valve shaft for selective rotation thereof.

In addition to the foregoing, the described engine may include one or more of the following features: wherein the bypass passage is an external conduit comprising a first conduit, a bypass catalyst conduit, and a second conduit, wherein the first conduit is fluidly coupled to the bypass port and configured to supply exhaust gas to the bypass catalyst conduit, which includes the bypass catalytic converter, and wherein the second conduit is fluidly coupled between the bypass catalyst conduit and a bypass flow inlet of the main exhaust aftertreatment system.

In addition to the foregoing, the described engine may include one or more of the following features: wherein the bypass flow inlet is formed in a main exhaust conduit of the main exhaust aftertreatment system, and wherein the bypass flow inlet is located upstream of the main catalytic converter; wherein the bypass flow inlet is located downstream of a turbocharger outlet; wherein the bypass flow inlet is oriented to direct exhaust gas flow onto an upstream face of the main catalytic converter to hasten heating thereof; wherein the bypass port is formed in a collector portion of the exhaust manifold; wherein the bypass passage is integrally formed within the cylinder head; and a water jacket formed in the cylinder head proximate a bypass catalyst conduit holding the bypass catalytic converter, wherein the water jacket is configured to circulate a coolant to provide cooling to the bypass catalytic converter.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
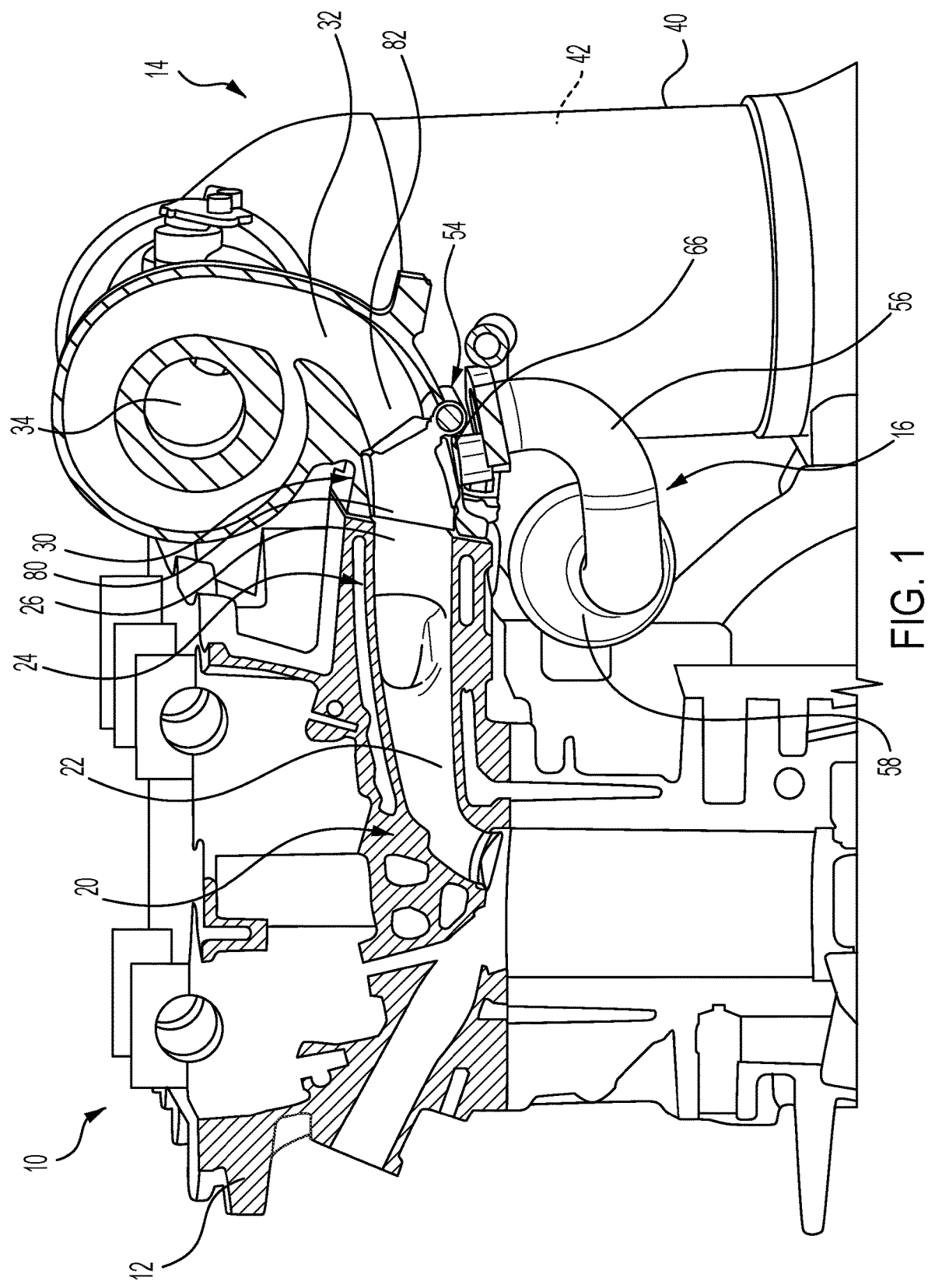
FIG. 1 is a sectional view of an example internal combustion engine with a light-off catalyst bypass system, in accordance with the principles of the present application.

Some conventional aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, CO, HC, and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet of the heat and/or turbocharger outlet and are typically in the main exhaust flow for the entire useful life of the vehicle.

Accordingly, described herein are systems and methods for a catalyst bypass system for improving tailpipe emissions during operation of an internal combustion engine. The system utilizes a specially designed dual-acting valve and bypass system with an additional integrated catalyst. During system operation, the dual-acting valve is actuated to enable targeted flow restriction through the exhaust manifold/turbine, to route the exhaust gases to one or more bypass catalysts instead of through the exhaust manifold/turbine before it re-enters the main exhaust path. This will allow for rapid catalyst light-off and improved conversion of harmful exhaust constituents without requiring multiple valve/actuation systems to restrict flow through the exhaust manifold/turbine, while also allowing flow through the bypass catalyst.

In some examples, system features include: a system that includes a dual-acting valve using a single actuator with a high restriction valve position to redirect engine exhaust gases; a system that allows exhaust gases to bypass the main exhaust flow path/turbine, through one or more additional catalysts used for start-up, long idle, and low main catalyst temperature conditions; and a valve system configured to seal high pressure exhaust gases (P3) from the exhaust manifold via machined valve seats that accommodate the dual-acting valve interface.

Additional example system features include: a valve system spindle with various forms of seals both axially and radially that seal the system from the external environment; the valve system is machined with a direct line of sight access through an inlet; the single piece dual-acting valve can be assembled through the inlet; and the system allows for increased emission system efficacy with decreased degradation due to aging.

In the example embodiments, the system utilizes a dual-acting valve operated via a single actuator, along with a bypass system that includes an auxiliary bypass catalyst. The dual-acting valve is configured to be used in combination with a bypass catalyst system that generally includes a flow passage, a catalyst, and a dual-acting valve for blocking off exhaust flow. The inlet to the bypass catalyst system is located before a turbine inlet or at the exhaust manifold collector. In some examples, the inlet is located as close as possible to the exhaust ports or cylinder head to minimize heat losses from the exhaust gas. As such, the close proximity of the auxiliary catalyst to the exhaust gas in the cylinder head enables rapid heating to hasten the conversion rate of harmful exhaust constituents.

Due to its small size and low surface area/distance between it and the exhaust valves, the bypass catalyst warms up much quicker than the conventional catalyst. During a cold engine start up event or other situation where it is desirable to have the exhaust gas flow through the catalyst bypass system, the dual-acting valve is actuated to restrict flow to the turbine and route the exhaust gas through the catalyst bypass system. Restricting flow from going directly to the turbine and to the conventional catalyst during cold start is desirable because the conventional catalyst cannot effectively convert exhaust constituents before it reaches a minimum or catalyst "light-off" temperature. The gas exiting the bypass catalyst is directed at the inlet of the main conventional catalyst to assist in the main catalyst in achieving a quicker light-off.

In the example embodiment, the system has two main positions, a bypass position and a default position. The bypass position is enabled when the valve is restricting main exhaust flow through the turbine and the exhaust gases are routed through the bypass catalyst system. The default position is enabled when the valve is allowing main exhaust flow through the turbine with a smooth flow path that has no interference of the dual-acting valve mechanics. In this way, the dual-acting valve is actuated to either the bypass or default position and sits flushed to a machined valve seat geometry that is completed with direct line of sight access for tooling and assembly. Once the main catalyst light-off is achieved, the valve can begin actuating to the default position.

Advantages of the system include: extremely fast catalyst light-off times; the dual-acting valve has the ability to seal off exhaust manifold/turbine or bypass route with a single valve and actuator (multiple valves not required); the ability to drive most or all of the exhaust flow through a bypass catalyst before going through the main exhaust path by using a single dual-acting valve with a single actuator; extremely short distance, surface area, and thermal mass between the exhaust ports and the bypass catalyst via bypassing the turbocharger turbine; the ability to deactivate the bypass catalyst after light-off; extremely high cell density substrate in the catalyst that would not be used in a non-bypassable system due to excessive backpressure; and the ability to move PGM (platinum group metals) away from the main catalyst and onto the bypass catalyst for better PGM utilization.

Known solutions to rapid catalyst light-off do not utilize a single dual-acting valve integrated with a single actuator in tandem with a bypass catalyst system to achieve improved cold start emissions. The flow restriction from the dual-acting valve directs the exhaust gas through the bypass catalyst system rather than the turbine, significantly reducing the wetted surface area and thermal mass that would remove heat before the main catalyst. That combined with the low thermal mass of the bypass catalyst itself results in very rapid catalyst warm up and very fast light-off times. This warmup behavior can facilitate the use of less extreme calibration strategies for generating more heat in the exhaust gas, which can improve NVH and decrease fuel consumption during cold start.

After rapid light-off, the catalyst begins effectively converting exhaust constituents via exothermic reactions and producing more exhaust heat, which assists in heating up the main catalyst. Once the main catalyst reaches light-off temperature, the dual-acting valve can be closed to block off the bypass catalyst and the conventional exhaust flow can continue. Selective deactivation of the bypass catalyst system provides benefits for both the bypass and main catalyst.

In one example, the bypass catalyst can have high precious metal loading with high cell density substrate so that it has very high conversion efficiency at cold start. Such a high cell density substrate could potentially cause significant exhaust backpressure in a conventional system, as well as speed aging due to continuous exposure to high exhaust temperatures and flows. Neither backpressure nor aging are concerns in the current system since the auxiliary bypass catalyst can be bypassed outside of cold start conditions. Similarly, the main catalyst can use fewer precious metals since it is not relied upon for cold start emissions. Precious metal loading of the main (and much larger) catalyst can make up a significant cost of the emissions system and is also responsible for aging or performance degradation of the emissions system during its full useful life.

Figure 2:
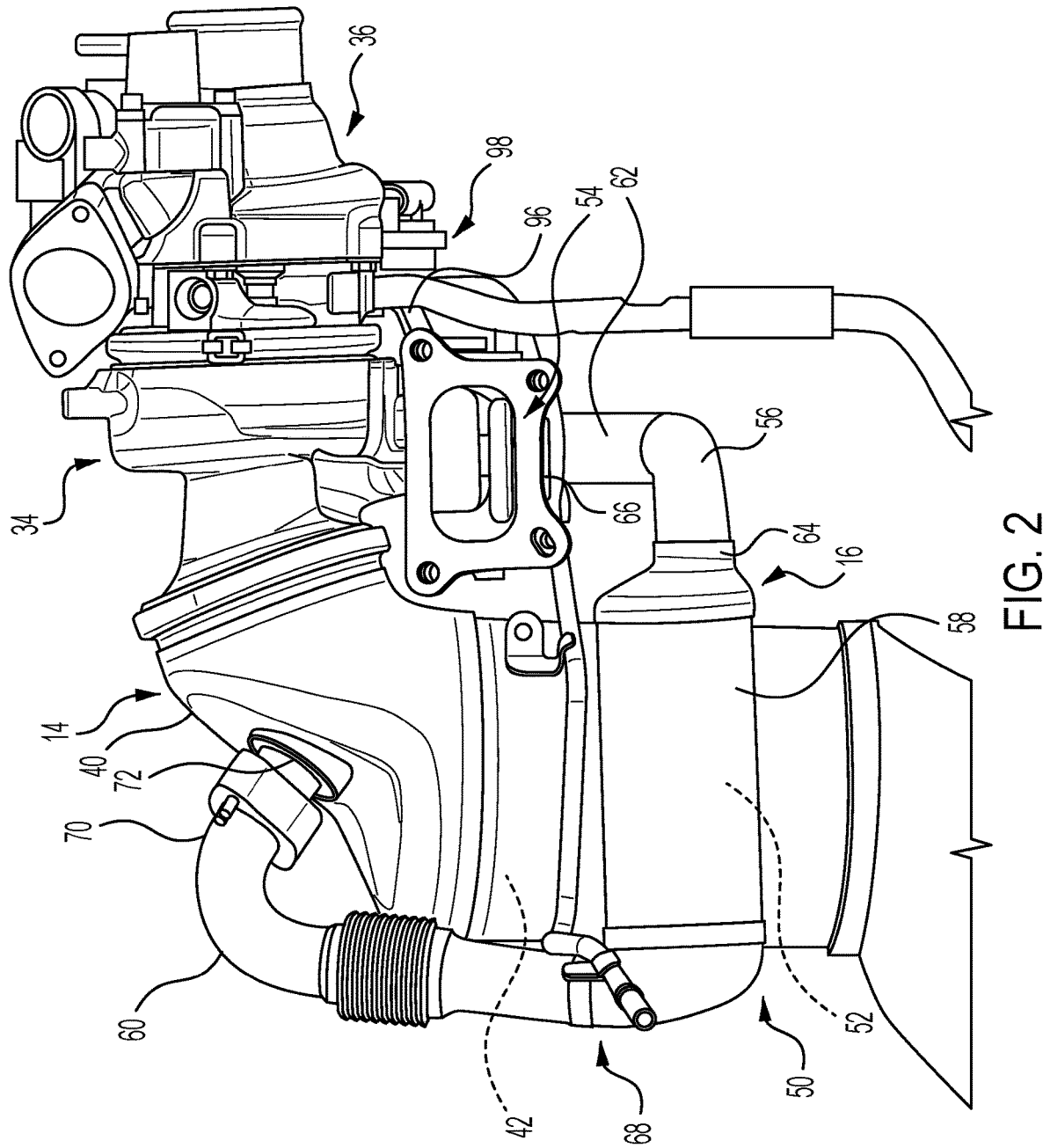
FIG. 2 is a side view of the example light-off catalyst bypass system of FIG. 1 shown coupled between a turbocharger and a main exhaust aftertreatment system, in accordance with the principles of the present application.
Figure 3:
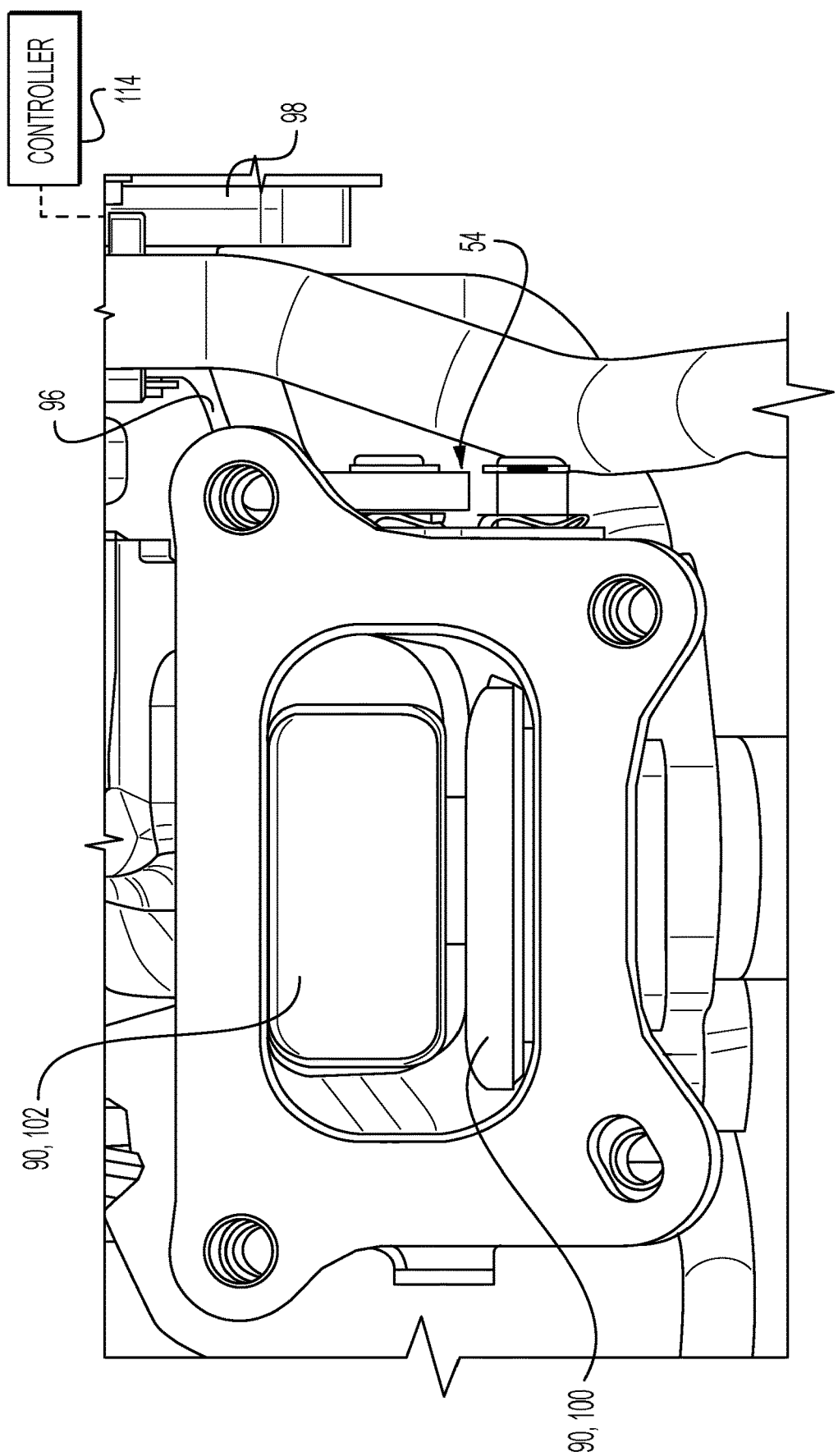
FIG. 3 is an enlarged view of FIG. 2 illustrating an example dual-acting valve assembly of the light-off catalyst bypass system, in accordance with the principles of the present application.
Figure 4:
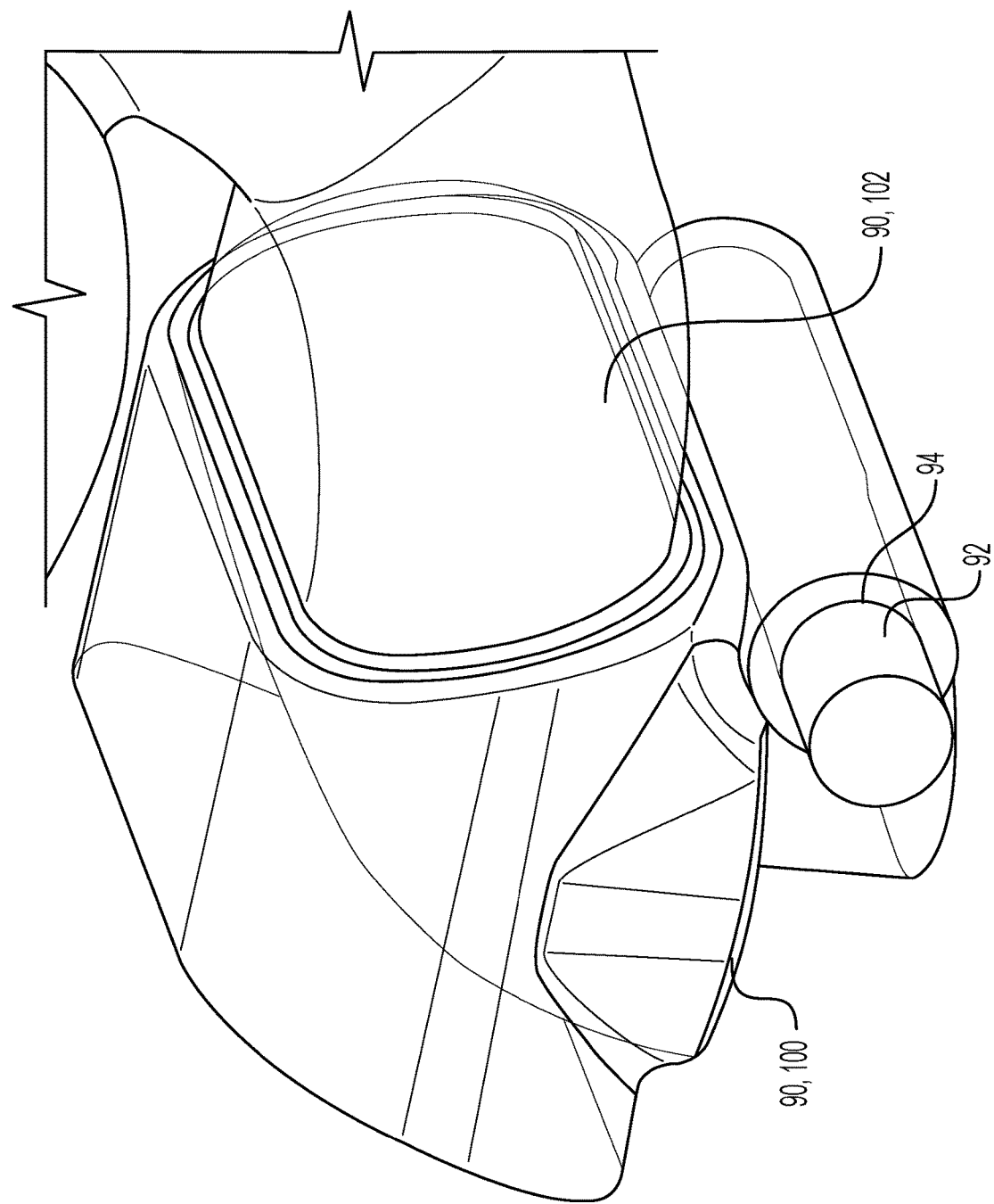
FIG. 4 is a perspective view of the example dual-acting valve assembly of FIG. 2 disposed within a main outlet duct, in accordance with the principles of the present application.
Figure 5:
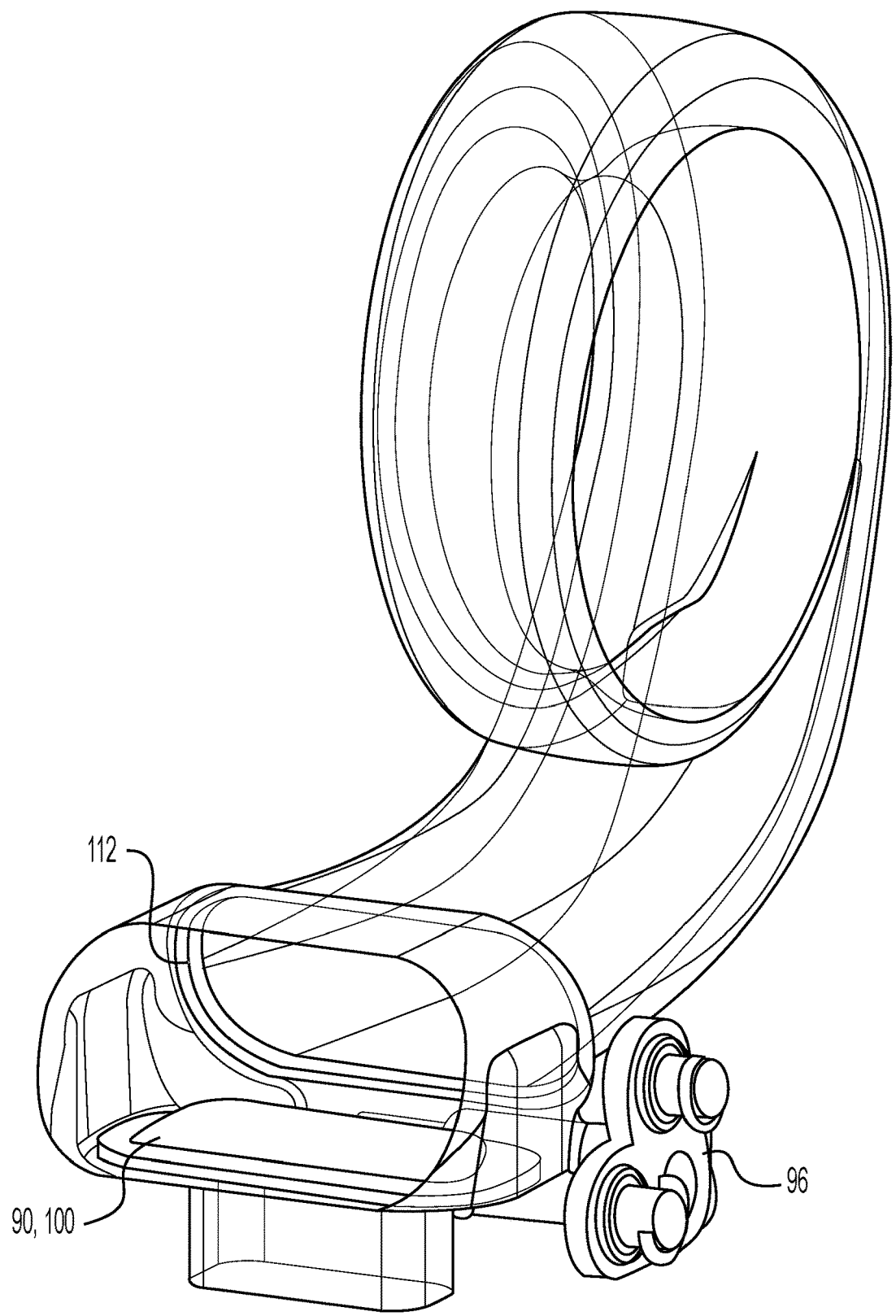
FIG. 5 is a perspective view of the example dual-acting valve assembly of FIG. 4 in a first position, in accordance with the principles of the present application.
Figure 6:
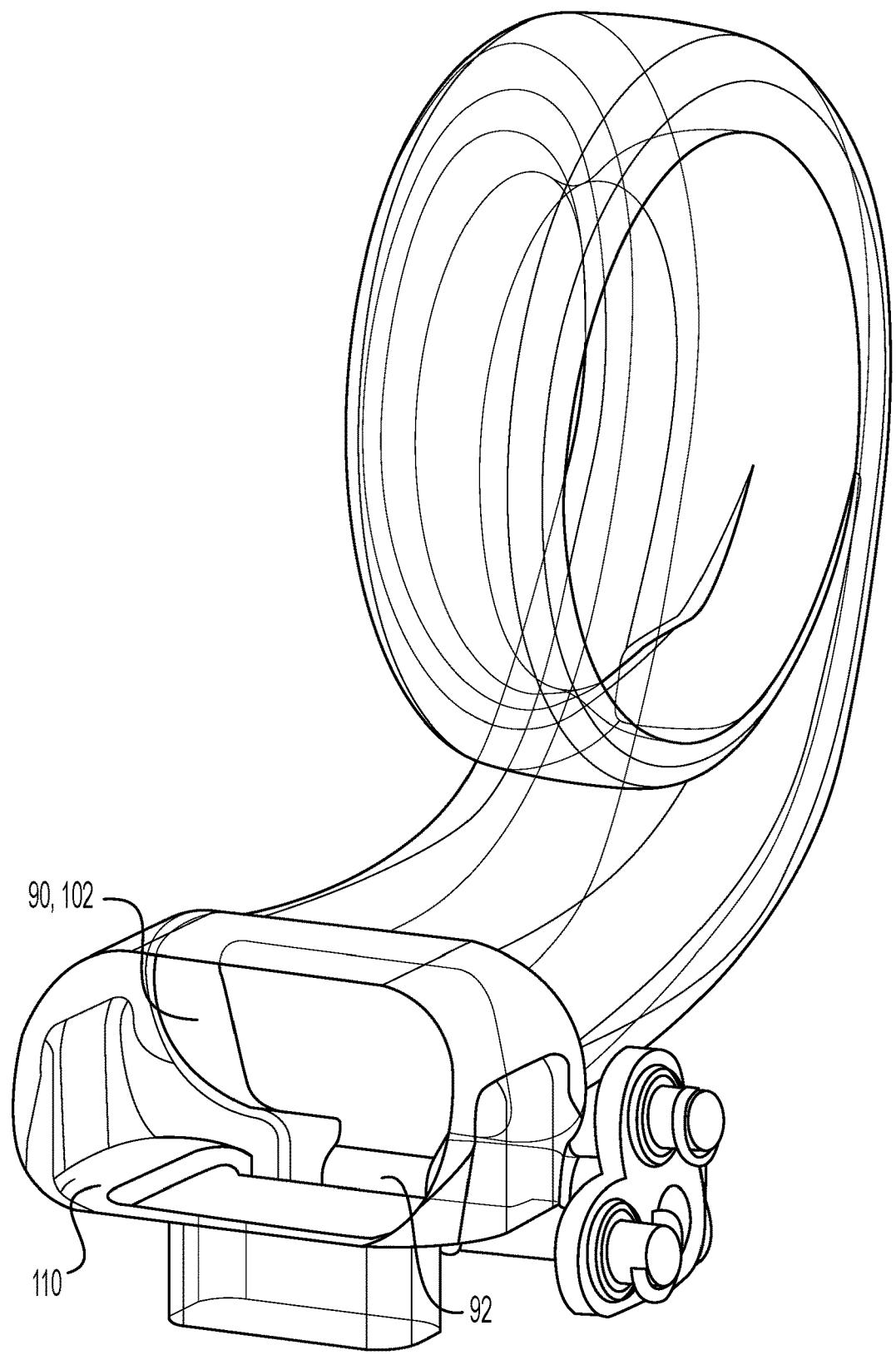
FIG. 6 is a perspective view of the example dual-acting valve assembly of FIG. 5 in a second position, in accordance with the principles of the present application.

With initial reference to FIGS. 1 and 2, an internal combustion engine 10 having a cylinder head 12 is illustrated. In the example embodiment, the cylinder head 12 is configured to selectively supply exhaust gas to a main exhaust aftertreatment system 14 and a light-off catalyst bypass system 16. As described herein in more detail, the light-off catalyst bypass system 16 is selectively utilized during cold start, long idle, and/or cold catalyst conditions to rapidly heat to light-off temperatures to quickly achieve low tailpipe emissions.

As shown in FIG. 1, the cylinder head 12 includes an integrated exhaust manifold 20 having a plurality of cylinder exhaust passages 22 that merge together to form a collector portion or main exhaust passage 24 having an outlet 26. In alternative embodiments, the exhaust manifold 20 may be coupled (e.g., bolted) to the cylinder head. A main outlet duct 30 receives exhaust gas from the manifold outlet 26 and is configured to direct the exhaust gas to the main exhaust aftertreatment system 14. In the illustrated example, the main outlet duct 30 is a separate and distinct component coupled to the cylinder head 12 and configured to provide exhaust gas to an inlet passage 32 of a turbocharger turbine 34. In some examples, the main outlet duct 30 and turbine inlet passage 32 are integral. Exhaust gas expanded in the turbine 34 is subsequently directed to the main exhaust aftertreatment system 14. However, it will be appreciated that engine 10 may include a supercharger rather than a turbocharger, or engine 10 may not include a turbocharger such that main outlet duct 30 is directly connected to the main exhaust aftertreatment system 14.

In the example embodiment, the main exhaust aftertreatment system 14 generally includes a main exhaust conduit 40 having one or more main catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold main outlet 26 (optionally via the turbocharger turbine 34) and is configured to receive exhaust gas from the vehicle engine 10 and supply the exhaust gas to the main catalytic converter 42. In order to efficiently reduce or convert CO, HC, and NOx, the main catalytic converter 42 must reach a predetermined light-off temperature. However, during some vehicle operations such as, for example, cold starts, long idle, and cold catalyst conditions, the main catalytic converter 42 is below light-off temperature and therefore has a low catalyst conversion efficiency.

In order efficiently reduce or convert the unwanted exhaust gas constituents while the main catalytic converter 42 is below the light-off temperature, the vehicle utilizes the light-off catalyst bypass system 16 to redirect at least a portion of the exhaust gas from the exhaust manifold 20, into a bypass passage 50, and through an auxiliary bypass catalytic converter 52. Because the bypass catalyst 52 is located close to the cylinder head 12, it is in close proximity to the engine combustion chambers and receives the exhaust gas quicker and at a higher temperature than the main catalytic converter 42 would. Thus, the bypass catalyst 52 is rapidly heated to its predetermined light-off temperature to achieve high catalyst conversion efficiency before the main catalytic converter 42 alone.

With continued reference to FIGS. 1 and 2, in the example embodiment, the light-off catalyst bypass system 16 generally includes the bypass passage 50, the bypass catalyst 52, and a dual-acting valve assembly 54. As shown in FIG. 2, the bypass passage 50 includes a first conduit 56, a bypass catalyst conduit 58, and a second conduit 60. The first conduit 56 includes a first end 62 and a second end 64. In the illustrated example, the first end 62 is configured to couple to the main outlet duct 30 at a bypass port 66 formed therein, which is proximate the dual-acting valve assembly 54. In the example embodiment, the first conduit first end 62 is configured to selectively receive and subsequently direct exhaust flow to the first conduit second end 64, which is fluidly coupled to the bypass catalyst conduit 58. The bypass catalyst conduit 58 is configured to house the bypass catalyst 52 and subsequently direct the exhaust flow to the bypass passage second conduit 60.

As shown in FIG. 2, the second conduit 60 includes a first end 68 and a second end 70. The first end 68 is fluidly coupled to the bypass catalyst conduit 58 to receive exhaust flow therefrom. The second conduit 60 directs the exhaust flow to the second end 70, which is fluidly coupled to the main exhaust conduit 40 at a bypass flow inlet 72. The bypass flow inlet 72 is located downstream of a turbocharger outlet 74 and upstream of the of the main catalytic converter 42. In the example embodiment, the bypass flow inlet 72 is oriented such that the flow of bypass exhaust is directed onto an upstream face of the main catalytic converter 42 to hasten warm-up thereof. In other arrangements, the bypass flow inlet 72 can be located in the turbocharger inlet and/or outlet.

As discussed, the bypass catalyst 52 is disposed within the bypass passage 50, which is fluidly connected between the main outlet duct 30 and the main exhaust conduit 40. The main outlet duct 30 defines an inlet 80, a main exhaust outlet 82, and the bypass port 66. The inlet 80 receives exhaust gas from the exhaust manifold outlet 26, the main exhaust outlet 82 directs exhaust to the main exhaust conduit 40, and the bypass port 66 directs exhaust to the bypass passage 50.

With additional reference to FIGS. 3-6, the dual-acting valve assembly 54 will be described in more detail. In the example embodiment, the dual-acting valve assembly 54 includes a valve seal or valve door 90 coupled to a valve spindle or shaft 92, which is rotatably seated within a bore 94 formed in the body of the main outlet duct 30 (shown in this example as part of the turbine inlet passage). The valve shaft 92 is operably coupled to an actuator link 96 (FIGS. 2-3), which is in turn operably coupled to an actuator assembly 98 (FIG. 2). In the illustrated example, actuator assembly 98 is coupled to a turbocharger housing 36 (as shown in FIG. 2), though it will be appreciated assembly 98 may be coupled to any suitable component of the engine 10. The actuator assembly 98 includes an actuator (e.g., motor, not shown), which is configured to selectively drive the actuator link 96 to rotate the valve shaft 92.

Rotation of the valve shaft 92 is configured to rotate the valve door 90 between a first position 100 (FIG. 5) at least partially blocking the bypass port 66 (default position), and a second position 102 (FIG. 6) at least partially blocking flow to the main exhaust outlet 82 (bypass position). As such, the single valve 64 is located within the main outlet duct 30 and is configured to move to any desired position between the first and second positions 100, 102.

Advantageously, in the example embodiment, the main outlet duct 30 is formed with a first valve seat 110 (FIG. 6) and a second valve seat 112 (FIG. 5), for example, via machining. The first and second valve seats 110, 112 are recessed within the main outlet duct 30 and sized and shaped like the valve door 90. In this way, in the first position 100, the valve door 90 seats flush within the recessed first valve seat 110 and completely seals the bypass port 66. As such, features of the valve door 90 are disposed out of the exhaust flow to facilitate preventing obstruction of exhaust gas flow within the main outlet duct 30. Similarly, in the second position 102, the valve door 90 seats flush within the recessed second valve seat 112 and completely seals the main exhaust outlet 82. As such, features of the valve door 90 are disposed out of the exhaust flow through bypass port 66 to facilitate preventing obstruction of exhaust gas flow within the main outlet duct 30.

A controller 114 (e.g., engine control unit) is in signal communication with valve assembly 54 (e.g., via actuator assembly 98) and is configured to move the valve assembly 54 to any position between the first and second positions 100, 102. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In one example, the bypass catalyst 52 is a three-way catalyst configured to remove CO, HC, and NOx from the exhaust gas passing therethrough, as described herein in more detail. However, it will be appreciated that bypass catalyst 52 may be any suitable catalyst that enables light-off catalyst bypass system 16 to remove any desired pollutant or compound such as, for example, a hydrocarbon trap or a four-way catalyst. In another example, bypass catalyst 52 has a cell density of between approximately 800 and approximately 1200 cells per square inch, or between 800 and 1200 cells per square inch.

In the example embodiment, the light-off catalyst bypass system 16 is configured to selectively operate in (i) a normal or warm catalyst mode, (ii) a cold catalyst mode, and (iii) a mixed flow mode. In the warm catalyst mode, controller 114 determines the main catalytic converter 42 has reached the predetermined light-off temperature (e.g., via temperature sensor, modeled, etc.) and moves the valve door 90 to the first position 100 (FIG. 5) sealing the bypass port 66. In this mode, the valve assembly 54 facilitates preventing the exhaust gas in the exhaust manifold 20 from entering the bypass passage 50 and thus bypass catalyst 52. Instead, the exhaust gas is directed through main exhaust passage 24 (and the turbine 34, if present), into the main exhaust conduit 40, and through the main catalytic converter 42 before being exhausted to the atmosphere.

In the cold catalyst mode, controller 114 determines the main catalytic converter 42 is below the predetermined light-off temperature or that another vehicle condition exists such as, for example, a cold start or long idle condition. The controller 114 moves the valve door 90 to the second position 102 (FIG. 6) sealing the main exhaust outlet 82. In this mode, valve assembly 54 facilitates preventing the exhaust gas in the exhaust manifold 20 from going directly to the main exhaust conduit 40. Instead, the exhaust gas is directed through bypass passage 50 and bypass catalyst 52 before being directed to the main exhaust conduit 40 and atmosphere. Once the main catalytic converter 42 has reached the light-off temperature, the controller 114 may then switch the light-off catalyst bypass system 16 to the normal mode.

In the mixed flow mode, controller 114 moves the valve door 90 to a partially open/closed condition between the first and second positions 100, 102. In this mode, a first portion of the exhaust gas from the exhaust manifold 20 is directed through the main exhaust outlet 82 and into the main exhaust conduit 40. At the same time, a second portion of the exhaust gas from the exhaust manifold 20 is directed through bypass passage 50 and bypass catalyst 52. The two portions of exhaust gas recombine in the main exhaust conduit 40 and are subsequently passed through the main catalytic converter 42 and exhausted to atmosphere. It will be appreciated that controller 114 can make real time adjustments to the position of valve door 90 to control various conditions of the vehicle and its exhaust aftertreatment system 14.

Figure 7:
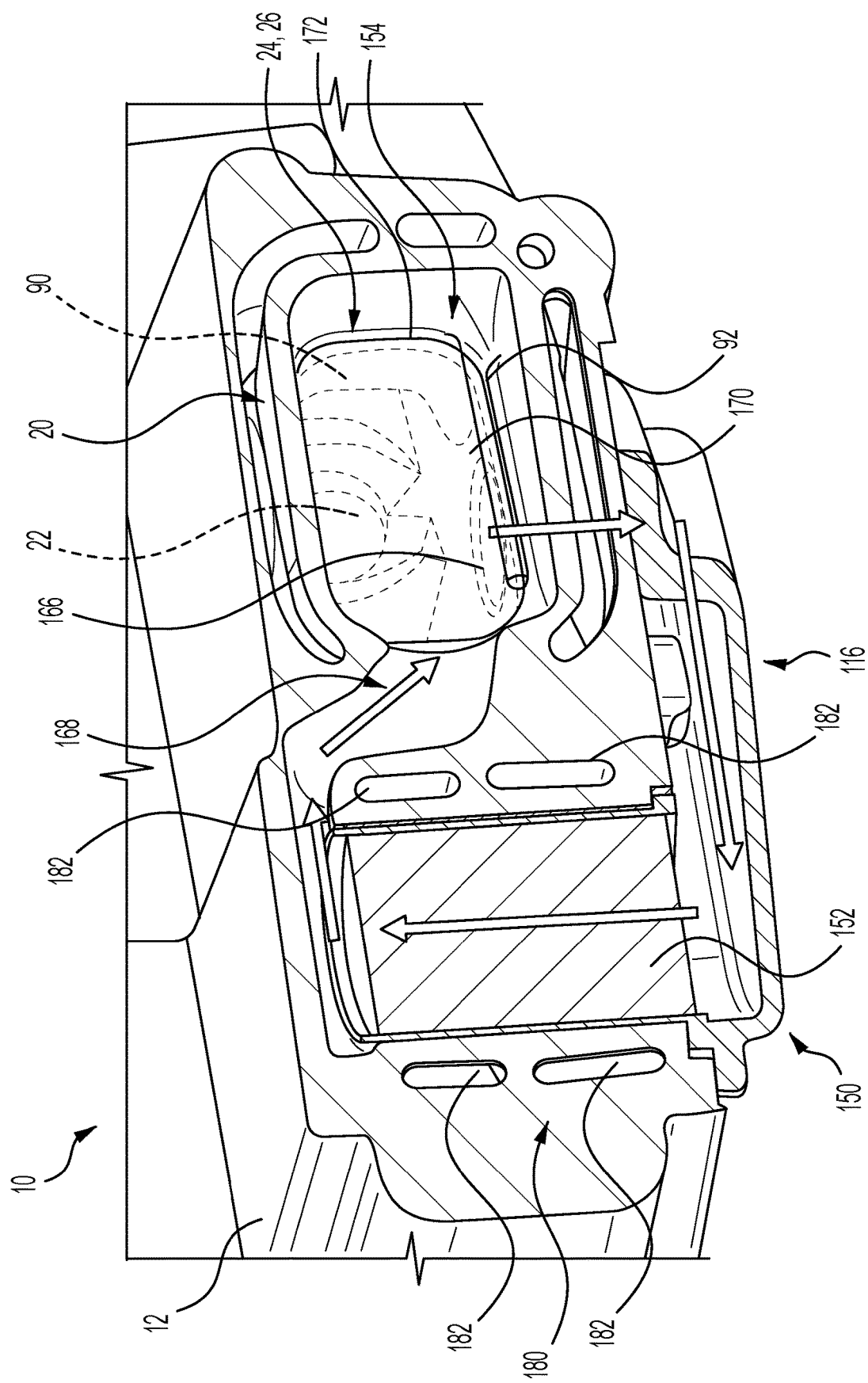
FIG. 7 is a sectional view of an example cylinder head and exhaust manifold with an integrated light-off catalyst bypass system, in accordance with the principles of the present application.

With reference now to FIG. 7, an alternative arrangement of the light-off catalyst bypass system is shown at reference numeral 116. The light-off catalyst bypass system 116 is similar to light-off catalyst bypass system 16 except the bypass passage and valve assembly are integrated into the cylinder head 12 and/or exhaust manifold 20. Like reference numerals indicate like parts. In the example embodiment, the light-off catalyst bypass system 116 includes a bypass passage 150 and a valve assembly 154 integrated into the exhaust manifold 20. The bypass passage 150 is formed in the body of the exhaust manifold 20, for example, via casting and/or machining. A bypass catalyst 152 is disposed within the bypass passage 150. A bypass port 166 is formed in the exhaust manifold main exhaust passage 24 proximate the valve assembly 154, which is positioned at the exhaust manifold outlet 26.

When the valve door 90 is in a first (default) position (not shown), the valve door 90 is seated flush within a valve seat 170 formed in the exhaust manifold 20 to seal the bypass port 166. When the valve door 90 is in a second (bypass) position (shown in phantom), the valve door 90 is seated flush within a valve seat 172 formed in the exhaust manifold 20 to thereby seal the exhaust manifold outlet 26. In this second position, exhaust gas in the exhaust manifold 20 is directed through the bypass port 166, through the bypass catalyst 152, and to an outlet port 168. The outlet port 168 is fluidly coupled to the bypass flow inlet 72, for example, via an external conduit (not shown). The light-off catalyst bypass system 116 otherwise operates in a manner similar to light-off catalyst bypass system 16.

In the example embodiment, cylinder head 12 and exhaust manifold 20 also include a water jacket 180. Advantageously, the water jacket 180 includes flow channels 182 extended to and disposed about the bypass passage 150 and the bypass catalyst 152. In this way, the cylinder head coolant loop extends around the bypass catalyst 152 and is configured to supply coolant (e.g., water) around the bypass catalyst 152. By keeping the bypass catalyst 152 at a lower temperature, particularly when exhaust gas is not passing therethrough (e.g., during normal operation), the life and durability of the catalyst 152 is extended.

Described herein are systems and methods for improving vehicle emissions systems efficiency, particularly during cold start, long idle, and low main catalyst temperature conditions. The system includes a light-off catalyst bypass with a dual acting valve that selectively blocks flow to a small bypass catalyst located in the bypass. When the valve is in a light-off position, exhaust gases from the exhaust ports are directed through the small bypass catalyst and eventually returned to the main exhaust system. When the valve is in normal operating condition, the exhaust flow is directed through the manifold and optional turbocharger directly to the main exhaust system.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine comprising:
   a cylinder head with an exhaust manifold configured to supply exhaust gas through a main exhaust outlet to a main exhaust aftertreatment system having a main catalytic converter,
   a main outlet duct configured to receive exhaust gas flow from the exhaust manifold and define the main exhaust outlet:
   a bypass passage in fluid communication with the exhaust manifold via a bypass port;
   a bypass catalytic converter disposed within the bypass passage; and
   a dual-acting valve assembly configured to move between a first position that seals the bypass port, and a second position that seals the main exhaust outlet,
   wherein during cold start, long idle, and/or low main catalytic converter temperature conditions, the dual-active valve assembly is moved to the second position to direct exhaust flow through the bypass passage and the bypass catalytic converter to reduce emissions,
   wherein the main outlet duct includes a recessed first valve seat formed around the bypass port, and
   wherein in the first position, the dual-acting valve assembly is configured to seat flush within the recessed first valve seat to facilitate preventing obstruction of exhaust gas flow within the main outlet duct;
   wherein the bypass passage is integrally formed within the cylinder head, and wherein the bypass catalytic converter is disposed within the bypass passage within the cylinder head.

2. The engine of claim 1, wherein the bypass port is formed in the main outlet duct.

3. The engine of claim 1, wherein the main outlet duct is a separate and distinct component configured to couple to the cylinder head.

4. The engine of claim 3, wherein the main outlet duct is a turbine inlet.

5. The engine of claim 1, wherein the main outlet duct further includes a recessed second valve seat formed around the main exhaust outlet, and
   wherein in the second position, the dual-acting valve assembly is configured to seat flush within the recessed second valve seat to facilitate preventing obstruction of exhaust gas flow through the bypass port.

6. The engine of claim 1, wherein the dual-acting valve assembly includes a valve door coupled to a valve shaft.

7. The engine of claim 6, wherein the valve shaft is rotatably seated within a bore formed in the main outlet duct, the valve shaft rotatable to move the valve door to the first position to seal the bypass port, and the second position to seal the main exhaust outlet.

8. The engine of claim 7, further comprising an actuator assembly operably coupled to the valve shaft to rotate the valve shaft within the bore.

9. The engine of claim 8, further comprising a turbocharger, wherein the actuator assembly is coupled to the turbocharger, and wherein an actuator link is operably coupled between the actuator assembly and the valve shaft for selective rotation thereof.

10. The engine of claim 1, wherein the bypass port is formed in a collector portion of the exhaust manifold.

11. The engine of claim 1, further comprising a water jacket formed in the cylinder head proximate a bypass catalyst conduit holding the bypass catalytic converter, wherein the water jacket is configured to circulate a coolant to provide cooling to the bypass catalytic converter.

* * * * *